Aug. 15, 1967     J. THÉVENAZ     3,336,095
GEAR-TYPE ADJUSTING MECHANISM FOR VARIABLE
FOCAL LENGTH OBJECTIVES
Filed Oct. 3, 1963

INVENTOR
JEAN THÉVENAZ

United States Patent Office 3,336,095
Patented Aug. 15, 1967

3,336,095
GEAR-TYPE ADJUSTING MECHANISM FOR VARIABLE FOCAL LENGTH OBJECTIVES
Jean Thevenaz, Grandson, Vaud, Switzerland, assignor to Paillard S.A., Vaud, Switzerland, a corporation of Switzerland
Filed Oct. 3, 1963, Ser. No. 313,466
Claims priority, application Switzerland, Oct. 8, 1962, 11,806/62
4 Claims. (Cl. 350—187)

This invention relates to a variable focal objective including a convergent variator and a base objective, the variator comprising two optical elements disposed in a cylindrical mounting, displaceable axially and synchronized according to a predetermined law. One of these elements is in the front and the other in the rear of the mounting. Also included is a mechanism which permits automatically insuring the synchronism of the displacement of the two optical elements and also permits the displacement of one of the elements independently of the other, while maintaining the synchronized connection between them.

In such arrangements already known, the constructions proposed are cumbersome, complicated and expensive.

The purpose of this invention is to provide a simple and compact construction of an objective of the above type. According to the invention, this objective is characterized in that the mechanism comprises a drive shaft provided with two gears one of which is in solid rotation with the shaft, while the other is rotatable thereon. These gears are respectively in mechanical connection with the front and rear optical elements, and are coupled to one another by satellite gears, in such a way that a displacement of the axis of the satellite gears causes a rotation of one of the first mentioned gears with respect to the other.

The attached drawing shows, schematically and by way of example, a preferred form of execution of the invention.

The objective shown comprises a cylindrical mounting 1 in which two optical elements 2 and 3 are slidably mounted. These elements comprise the variator system of the variable focal objective. The objective also includes a base objective, not shown, the rays finally emerging from the mounting through a window 4.

Figure 1:
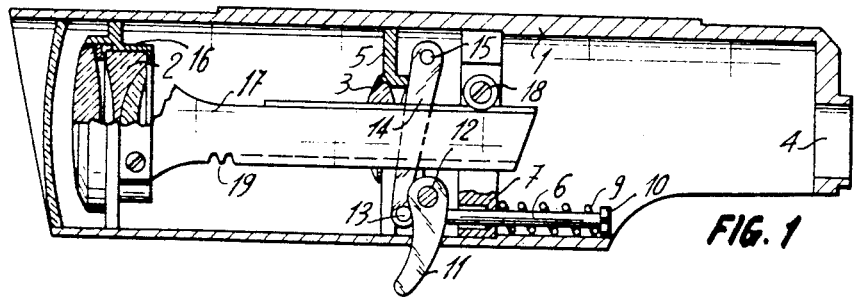
FIGURES 1 to 3 show, in partial longitudinal section, and with certain parts cut away, a preferred form of execution in different operating positions.

In FIGURE 1, certain parts of the mechanism are not shown so as to more clearly show the parts which insure the displacement of the rear optical element 3. This element 3 is fixed to a metal support 5 mounted for sliding movement inside the cylindrical mounting 1. The support 5 has a rod 6 fixed rigidly to the lower portion thereof, said rod passing through a bore in a fixed member 7 solid with the mounting 1. The member 7 is annular in shape to permit the passage of light rays.

Figures 4, 5:
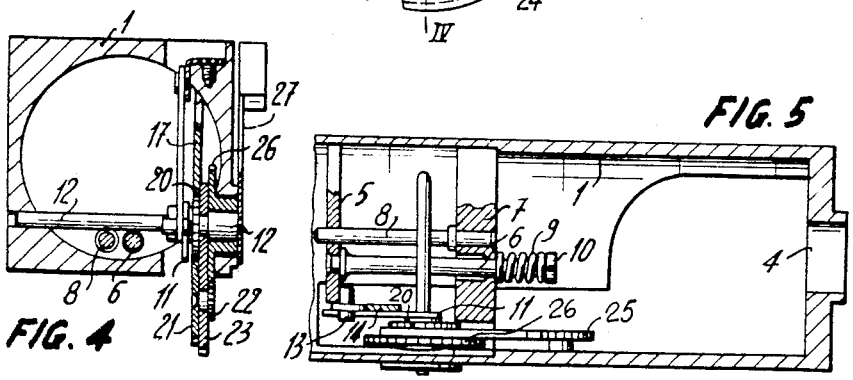
FIGURE 4 is a cross section along line IV—IV in FIGURE 3.
FIGURE 5 is a partial longitudinal section along line V—V in FIGURE 3, certain parts being omitted for clarity.

These various parts are also clearly shown in FIGURE 5, which also shows that member 7 is provided with a rod 8 fixed thereto and passing through a hole in support 5, in order to prevent the support from rotating along the axis of the cylindrical mounting 1.

Rod 6 is provided with a spring 9, one end of which presses against fixed member 7 and the other end of which presses against a screw head 10 at the end of rod 6. This spring tends to pull support 5 to the rear.

The displacements of the rear of optical element 3 are controlled by a cam 11 fixed on a drive shaft 12. The profile of this cam acts on a finger 13 carried by a lever 14, which is pivoted at 15 to the mounting 1. Finger 13 presses in turn against the rear surface of support 5, as shown in FIGURE 5, and transmits the force exerted by the cam 11 to displace support 5 against the action of spring 9.

The front optical element 2 is fixed on a support 16 also slidable in mounting 1. The support is connected rigidly to a rack 17, provided with a smooth upper edge which is beveled and presses against a conical stud 18 which guides the rack. The lower edge of the rack is provided with a series of teeth 19 which engage with a pinion 20 (see FIGURES 2, 3, and 4) which is freely mounted on the drive shaft 12. The pinion 20 also engages a gear wheel 21 forming part of a planetary gearing arrangement including said wheel 21 and a pinion 22. The gear wheel 21 and pinion 22 are each fixed to a common axle rotatably supported on a sector 23 and are disposed on opposite sides of the sector. The sector 23 is freely mounted on the shaft 12 and is provided with teeth 24 which engage a pinion 25. Pinion 22 engages gear wheel 26 which is solid in rotation with drive shaft 12. FIGURE 4 shows a control lever 27 fixed to the end of shaft 12 to permit controlling the rotation thereof.

When lever 27 is actuated, drive shaft 12 is rotated which causes a rotation of cam 11 which in turn displaces the rear optical element 3, and also causes rotation of toothed wheel 26 which is fixed to shaft 12 and is linked mechanically by means of pinion 22, a gear wheel 21 and pinion 20 with rack 17 controlling the displacement of the front optical element 2. If the pinion 25, which engages with sector 23, is subjected to a sufficient frictional couple, sector 23 being freely rotatable on drive shaft 12, remains stationary when drive shaft 12 is rotated so that the axes of the planetary gears 21 and 22 also remain stationary. Rotation of the toothed wheel 26 as above described, is thus transmitted to the toothed wheel 20 by means of planetary gears 21 and 22 which insure a supermultiplication in the transmission ratio. Thus, the angular displacement of the toothed wheel 20 is greater than that of toothed wheel 26.

Figure 2:
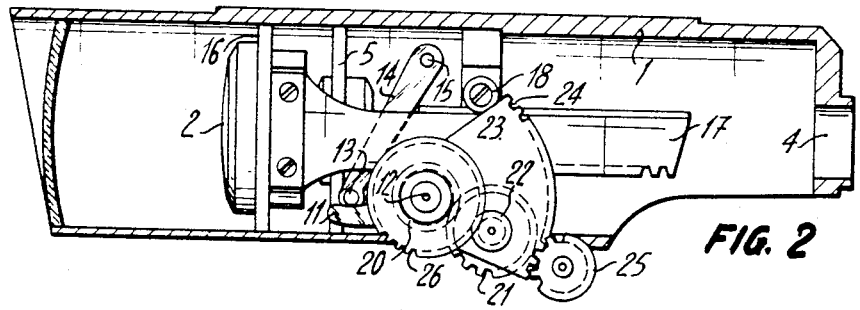
Figure 3:
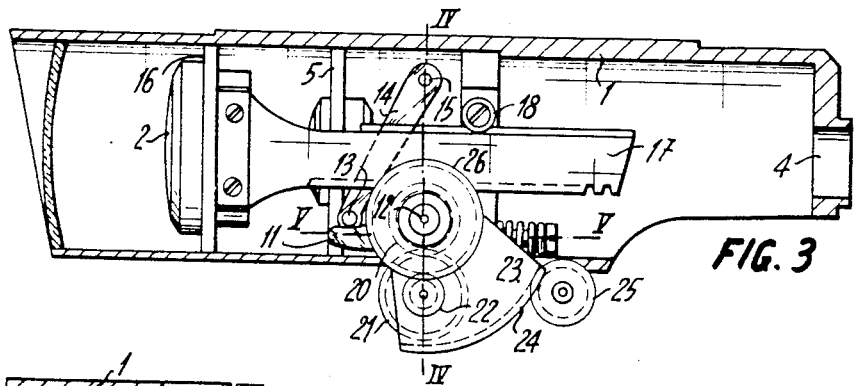

When the pinion 25 is rotated by means of a control knob (not shown), the drive shaft 12 being subjected to a sufficient frictional couple for it to remain stationary, there is caused rotation of sector 23 between the two extreme positions which are shown in FIGURES 2 and 3 respectively. The planetary gears 21 and 22 then move with respect to toothed wheels 20 and 26. Since the latter remains fixed, because shaft 12 is stationary, pinion 22 turns on the periphery of the gear 26 and causes by means of gear 21, the rotation of pinion 20 which displaces rack 17.

It is clear from the above that, rotation of the drive shaft 12, causes synchronized displacement of the two optical elements 2 and 3 according to a law determined by the optical conditions of the objective. To automatically insure the relation which connects the displacement of the elements 2 and 3, cam 11 is provided with the profile necessary for realization of this law of displacements, allowing for the ratio of multiplication between the angular displacements of the toothed wheels 20 and 26. This synchronous displacement of the elements 2 and 3 permits varying the focal distance of the objective.

On the other hand, when pinion 25 is actuated, there is caused only a displacement of the front element 2, which does not affect the focal distance of the objective, but varies the focusing. From the optical point of view, there can be produced an objective of the type shown and described, in which the displacement of the front element 2 permits adjustment of the focus, this displacement remaining the same regardless of the focal distance selected for the objective. Thus, when it is desired to take a movie of a subject, one can first adjust the focus by rotating the pinion 25 by means of a control knob, not shown, then select the desired focal distance, which can be altered in the course of the picture-taking without changing the focus.

FIGURE 1 shows the optical elements in the position which provides a minimum focal distance of the objective, while FIGURE 2 shows the position which these elements should occupy if the objective is to have its greatest focal distance, the focus then being set on infinity. In FIGURE 3, the objective is still set for minimum focal distance, i.e., to operate as a telescopic lens, but the optical element 2 is advanced to obtain a very close focus.

The objective shown and described has many advantages among which are the following:

(1) The range of focals covered by the variator can be very wide while retaining a simple optic.

(2) The focusing can be made for a distance very close to the subject.

(3) The mounting of the objective is greatly simplified.

(4) For any picture-taking with normal focal or long focal, the mounting of the objective comprises a very effective sunshade.

(5) The control button of the focus can be placed in a position which makes it very accessible and easy to operate.

(6) The control lever of the focals can be integrated in the apparatus in a discreet but very accessible position, and its cam can be selected judiciously by an adequate choice of the gears in the planetary system.

(7) A swallow tail guide system of the rack permits insuring a non-jamming displacement of the front element of the variator which can thereby be very small in size.

I claim:

1. A lens assembly for cameras including a mounting member (1), and axially movable front (2) and rear (3) lens members disposed within said mounting member (1), means for moving said lens members synchronously and also permitting movement of one of said lens members independently of the other, said means comprising, a drive shaft (12) rotatably secured in said mounting member (1), actuating means (27) fixed to said drive shaft for rotation thereof, cam means (11) fixed to said drive shaft to displace said rear lens member (3) when said drive shaft is rotated, a first gear (26) fixed to said drive shaft, a second gear (20) rotatable on said drive shaft, first coupling means (23, 21, 22) connecting said first (26) and second (20) gears to each other and second coupling means (17) connecting said second gear (20) to said front lens member (2) to permit synchronous movement of said lens members upon rotation of said drive shaft (12) by said actuating means (27), said first coupling means including a pair of satellite gears (21, 22) rotatably mounted on a common axis and movable in unison on a support member (23) rotatable on said drive shaft, one of said satellite gears (22) in engagement with said first gear (26) and the other satellite gear (21) in engagement with said second gear (20), and means (25) rotating said support member (23) to displace the axis of said satellite gears (21, 22) relative to said drive shaft (12) to permit independent movement of said front lens member (2).

2. The structure of claim 1 wherein said second coupling means comprises a rack (17) secured to said front lens member (2) and in engagement with said second gear (20).

3. The structure of claim 2 wherein said support member (23) is a toothed sector and the means (25) for rotating the sector is a pinion engaging the teeth of said sector.

4. The structure of claim 2 wherein said pinion (25) and said drive shaft (12) are under sufficient frictional couple to prevent one from rotating when the other is entrained in rotation, and vice-versa.

References Cited

UNITED STATES PATENTS

| | | | |
|---|---|---|---|
| 2,515,104 | 7/1950 | Walker | 88—57 |
| 3,093,040 | 6/1963 | Kiper | 95—44 |

JEWELL H. PEDERSEN, *Primary Examiner.*

R. J. STERN, *Assistant Examiner.*